(12) United States Patent
Burke

(10) Patent No.: US 10,716,728 B2
(45) Date of Patent: Jul. 21, 2020

(54) MAGNETIC CONVEYANCE SYSTEM

(71) Applicant: Donald Burke, Kansas City, MO (US)

(72) Inventor: Donald Burke, Kansas City, MO (US)

(*) Notice: Subject to any disclaimer, the term of this patent is extended or adjusted under 35 U.S.C. 154(b) by 0 days.

(21) Appl. No.: 16/162,048

(22) Filed: Oct. 16, 2018

(65) Prior Publication Data

US 2019/0046388 A1 Feb. 14, 2019

Related U.S. Application Data

(63) Continuation of application No. 15/843,932, filed on Dec. 15, 2017, now Pat. No. 10,123,931, which is a
(Continued)

(51) Int. Cl.
*A61H 3/00* (2006.01)
*A61G 7/10* (2006.01)
(Continued)

(52) U.S. Cl.
CPC .......... *A61H 3/008* (2013.01); *A61G 7/1015* (2013.01); *A61G 7/1046* (2013.01); *A61G 7/1051* (2013.01); *A61G 7/1067* (2013.01); *F16C 29/06* (2013.01); *H05K 999/99* (2013.01); *A61G 7/1044* (2013.01); *A61H 2201/0157* (2013.01);
(Continued)

(58) Field of Classification Search
CPC ............ A61H 3/008; A61H 2201/1207; A61G 7/1015; A61G 7/1046; A61G 7/1051; A61G 7/1067; A61G 7/1044
See application file for complete search history.

(56) References Cited

U.S. PATENT DOCUMENTS 1,350,297 A 8/1920 Cooley
2,742,250 A 4/1956 Cronberger
(Continued)

FOREIGN PATENT DOCUMENTS

CN 101407181 A 4/2009
CN 102160838 A 8/2011
(Continued)

OTHER PUBLICATIONS

Flexible Hanging Solutions brochure, BASIQSYSTEMS, 25 pages.

*Primary Examiner* — Jason C Smith
(74) *Attorney, Agent, or Firm* — Husch Blackwell LLP

(57) ABSTRACT

A magnetic conveyance system comprising a support structure having a ferromagnetic capacity and a trolley moveable upon the support structure in a plurality of directions. The trolley may include a trolley frame and at least one attractor cell disposed on the trolley frame. The at least one attractor cell may comprise a housing and at least one magnet, at least one friction reducing load spreading device, and a load transfer member disposed within the housing. The magnet may provide a magnetic attraction force between the trolley and the support structure. The friction reducing load spreading device may comprise a plurality of bearing balls circulating within a reservoir and a channel formed by the load transfer member disposed within the housing. The load transfer member may also include a bearing surface wherein a portion of the plurality of bearing balls is disposed between the bearing surface and the support structure.

8 Claims, 14 Drawing Sheets

Related U.S. Application Data continuation of application No. 14/455,367, filed on Aug. 8, 2014, now Pat. No. 9,867,754.

(60) Provisional application No. 61/864,545, filed on Aug. 10, 2013.

(51) Int. Cl.
*F16C 29/06* (2006.01)
*F16C 29/04* (2006.01)
*F16C 19/50* (2006.01)

(52) U.S. Cl.
CPC ......... *A61H 2201/0184* (2013.01); *A61H 2201/1207* (2013.01); *A61H 2201/1621* (2013.01); *A61H 2201/1652* (2013.01); *A61H 2201/5007* (2013.01); *A61H 2201/5061* (2013.01); *A61H 2201/5097* (2013.01); *F16C 19/507* (2013.01); *F16C 29/046* (2013.01)

(56) References Cited

U.S. PATENT DOCUMENTS

| | | | |
|---|---|---|---|
| 3,239,179 A | 3/1966 | Margulis | |
| 3,376,578 A | 4/1968 | Sawyer | |
| 3,498,405 A | 3/1970 | Charpentier | |
| 3,522,923 A * | 8/1970 | Charpentier | E04B 9/248 52/489.2 |
| 4,243,147 A | 1/1981 | Twitchell et al. | |
| 4,245,442 A | 1/1981 | Durham | |
| 4,647,226 A * | 3/1987 | Mottate | F16C 29/063 384/45 |
| 4,747,246 A | 5/1988 | Sanborn | |
| 4,796,765 A * | 1/1989 | Mayne | B66C 9/00 212/271 |
| 5,456,655 A | 10/1995 | Morris | |
| 6,079,578 A * | 6/2000 | Dyson | A61G 7/1015 104/89 |
| 6,101,952 A * | 8/2000 | Thornton | B60L 13/003 104/130.02 |
| 6,238,216 B1 | 5/2001 | Menelly | |
| 6,315,138 B1 | 11/2001 | Dyson | |
| 6,435,464 B1 | 8/2002 | Sullivan et al. | |
| 6,879,157 B1 * | 4/2005 | Bonanni | G01R 33/3806 324/309 |
| 6,917,136 B2 * | 7/2005 | Thornton | H02K 1/08 310/180 |
| 7,303,049 B1 * | 12/2007 | Greenlee | B66C 17/06 182/3 |
| 7,843,295 B2 * | 11/2010 | Fullerton | G09F 7/04 24/303 |
| 7,930,775 B2 | 4/2011 | Kluckhuhn | |
| 7,961,069 B2 | 6/2011 | Fullerton et al. | |
| 8,128,068 B2 | 3/2012 | Chepurny et al. | |
| 8,656,674 B1 * | 2/2014 | Woodward | E04F 13/142 52/388 |
| 8,671,474 B2 | 3/2014 | Chepurny | |
| 8,833,533 B2 * | 9/2014 | Suh | B60L 11/007 104/281 |
| 2001/0044577 A1 * | 11/2001 | Braun | A61B 5/055 600/417 |
| 2004/0155534 A1 | 8/2004 | Engwall | |
| 2008/0202053 A1 * | 8/2008 | Guy | E04F 15/02144 52/391 |
| 2010/0270252 A1 | 10/2010 | Chepurny et al. | |
| 2011/0078970 A1 | 4/2011 | Boyd | |
| 2011/0214588 A1 * | 9/2011 | Grubling | A61G 7/08 104/118 |
| 2012/0000156 A1 * | 1/2012 | Esposito | E04F 15/02144 52/309.13 |
| 2013/0234817 A1 * | 9/2013 | Kocijan | B25B 11/002 335/295 |
| 2015/0041287 A1 * | 2/2015 | Burke | A61H 3/008 198/750.13 |

FOREIGN PATENT DOCUMENTS

| | | |
|---|---|---|
| DE | 279047 A1 | 5/1990 |
| GB | 2268947 A | 1/1994 |
| JP | 4350000257 | 8/1994 |
| JP | 08-059200 | 3/1996 |
| JP | 09276347 A | 10/1997 |
| JP | 2002249552 | 8/2002 |
| JP | 2004231332 A | 8/2004 |
| JP | 2004298313 A | 10/2004 |
| JP | 2007097874 A | 4/2007 |
| SU | 653438 A1 | 3/1979 |
| WO | 2008126120 A2 | 10/2008 |
| WO | 2012081547 A1 | 6/2012 |

\* cited by examiner

MAGNETIC CONVEYANCE SYSTEM

CROSS-REFERENCE TO RELATED APPLICATION

This application is a continuation of U.S. patent application Ser. No. 15/843,932 filed Dec. 15, 2017, and a continuation of U.S. Pat. No. 9,867,754 issued Jan. 16, 2018, and claims the benefit of U.S. Provisional Patent Application No. 61/864,545 filed Aug. 10, 2013, the entire disclosures of which are hereby incorporated by reference.

FIELD OF THE INVENTION

This present invention relates to a magnetic conveyance system which can be utilized in residential, commercial, or industrial applications that provides lifting and mobility assistance anywhere a related support structure is installed.

BACKGROUND OF THE INVENTION

Two important factors in determining when an elderly or physically disabled person requires institutional care is when they (1) lack the mental facilities to take care of themselves and/or (2) lack the physical functionality to move about their living environments on their own. In many circumstances, many people who lack the physical function for full mobility about their living environment have sharp mental awareness. These mentally competent persons often resist being placed into a full-time care facility or to have home-aids who have to be present twenty-four hours a day, seven days a week, to ensure that the person can access all necessary facilities in their living environment. These mentally competent persons only need a reliable and safe way for them to move about their living environment in order to live independently. There are a few track-based mobility systems that can be installed in residential or institutional applications, but these track-based systems limit the access points, positioning and travel paths which a person can traverse while supported by the track-based mobility system. Thus, there is a need in the art for a conveyance system which facilitates movement of a person receiving assistance throughout substantially the entire living environment.

Track-based overhead conveyance systems are also utilized in hospital, institutional, commercial, and industrial environments to provide lifting and/or conveyance assistance for human patients or other articles. Nurses often implement such track-guided hoist or conveyance systems to assist with removing patients from a bed to go to a bathroom. Track-based overhead conveyance systems are also used as aids in physical therapy to carry a certain percentage of the patient's overall body weight for walking while recovering from an injury. Again, the track-based overhead conveyance systems limit the direction of travel and the locations which are accessible by a patient because the person or item being conveyed cannot travel to or access locations where there is no track present on the ceiling or connected to the support structure. Thus, there is a need in the art for a conveyance system which facilitates movement of a person or other item throughout substantially the entirety of the desired spatial environment.

It is recognized that the above-identified shortcomings in patient or person track-based overhead conveyance systems, including but not limited to limited travel paths, limited access to areas of a living environment, the inability for multiple objects to be supported and move at the same time, may also be experienced in countless numbers of other applications. Such applications which use track-based conveyance systems may include industrial uses, manufacturing, auto service and repair, shipping and logistics, interior design, storage, warehousing, laboratory, brewing, photography, video and stage production, and many other applications. As such, there is a broad need for a conveyance system which facilitates movement and/or positioning of any item throughout substantially the entirety of the desired spatial environment.

SUMMARY OF THE INVENTION

The present invention is directed toward a magnetic conveyance system comprising a support structure having a ferromagnetic capacity and a trolley moveable relative upon the support structure, wherein the trolley comprises at least one magnet and at least one friction reducing load spreading device. Support structure may generally be a substantially smooth and/or planar surface. In one embodiment of the present magnetic conveying system, the support structure may be a ceiling. The support structure may be comprised of a plurality of ceiling panels that are installed over the area of an entire ceiling or only a portion thereof. However, the support structure may also be a floor, wall, or other substantially smooth surface.

The at least one magnet is operable to exert a magnetic attraction force between the trolley and the support structure. The ferromagnetic capacity of the support structure may be equal to or slightly greater than a desired magnetic attraction force provided by the at least one magnet. The friction reducing load spreading device of the magnetic conveyance system may act to separate the support structure and the trolley by a clear distance to prevent the magnet from attaching directly to the support structure. In one embodiment, the friction reducing load spreading device may comprise an open-ball-transfer device. The open-ball-transfer device may comprise a plurality of bearing balls circulating within a housing to provide one of load distribution and friction reduction.

The trolley may also comprise at least one attractor cell, the attractor cell may comprise a housing and at least one magnet and at least one friction reducing load spreading device operably disposed within the housing. The attractor cell may also include a load transfer member, wherein the load transfer member is positioned and suspended within the housing to form a reservoir and a channel wherein the plurality of bearing balls may circulate through the housing through the reservoir and the channel. The load transfer member may include at least one magnet integrated into it, or it may be of solid non-magnetic construction. Alternatively, a magnetic array comprising a plurality of arranged magnets may be incorporated into the load transfer member. The load transfer member may have a bearing surface and a portion of the plurality of bearing balls may be disposed between the bearing surface and the support structure to provide a reduced-friction interface. The attractor cell may be connected to the trolley with an articulating connection that may essentially act as an independent suspension for the attractor cell relative to the trolley. The trolley may also include an automatic or mechanical brake which prevents the trolley from moving relative to the support structure or in a direction parallel to a bearing surface of the support structure until the brake is released.

Other aspects and advantages of the present invention will be apparent from the following detailed description of the preferred embodiments and the accompanying drawing figures.

BRIEF DESCRIPTION OF THE SEVERAL VIEWS OF THE DRAWINGS

The accompanying drawings form a part of the specification and are to be read in conjunction therewith, in which like reference numerals are employed to indicate like or similar parts in the various views.

DETAILED DESCRIPTION OF THE INVENTION

The following detailed description of the present invention references the accompanying drawing figures that illustrate specific embodiments in which the invention can be practiced. The embodiments are intended to describe aspects of the present invention in sufficient detail to enable those skilled in the art to practice the invention. Other embodiments can be utilized and changes can be made without departing from the spirit and scope of the present invention. The present invention is defined by the appended claims and, therefore, the description is not to be taken in a limiting sense and shall not limit the scope of equivalents to which such claims are entitled.

Figure 1:
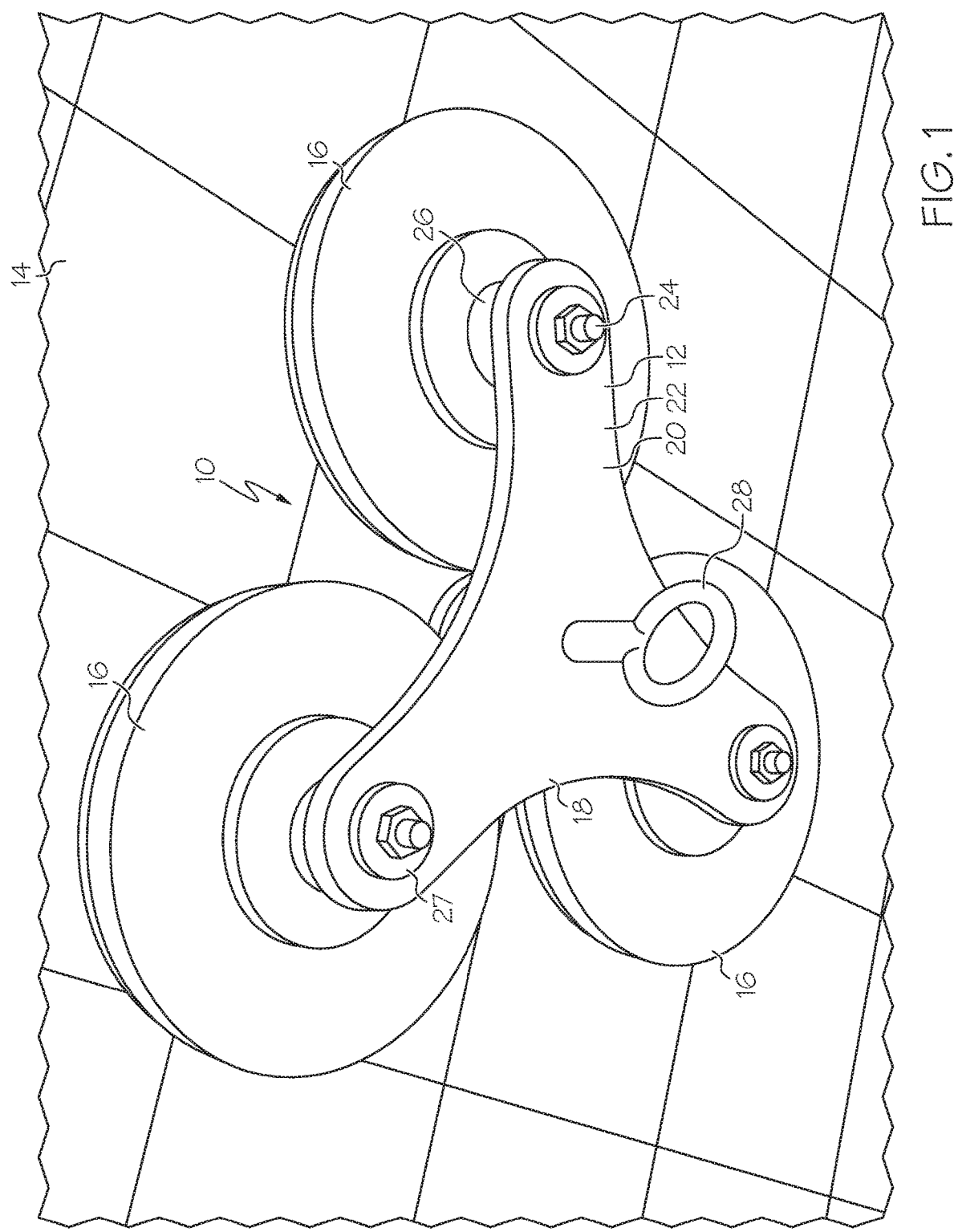
FIG. 1 is a bottom perspective view of one embodiment of a trolley of a magnetic conveyance system in accordance with the teachings of the present disclosure.
Figure 8:
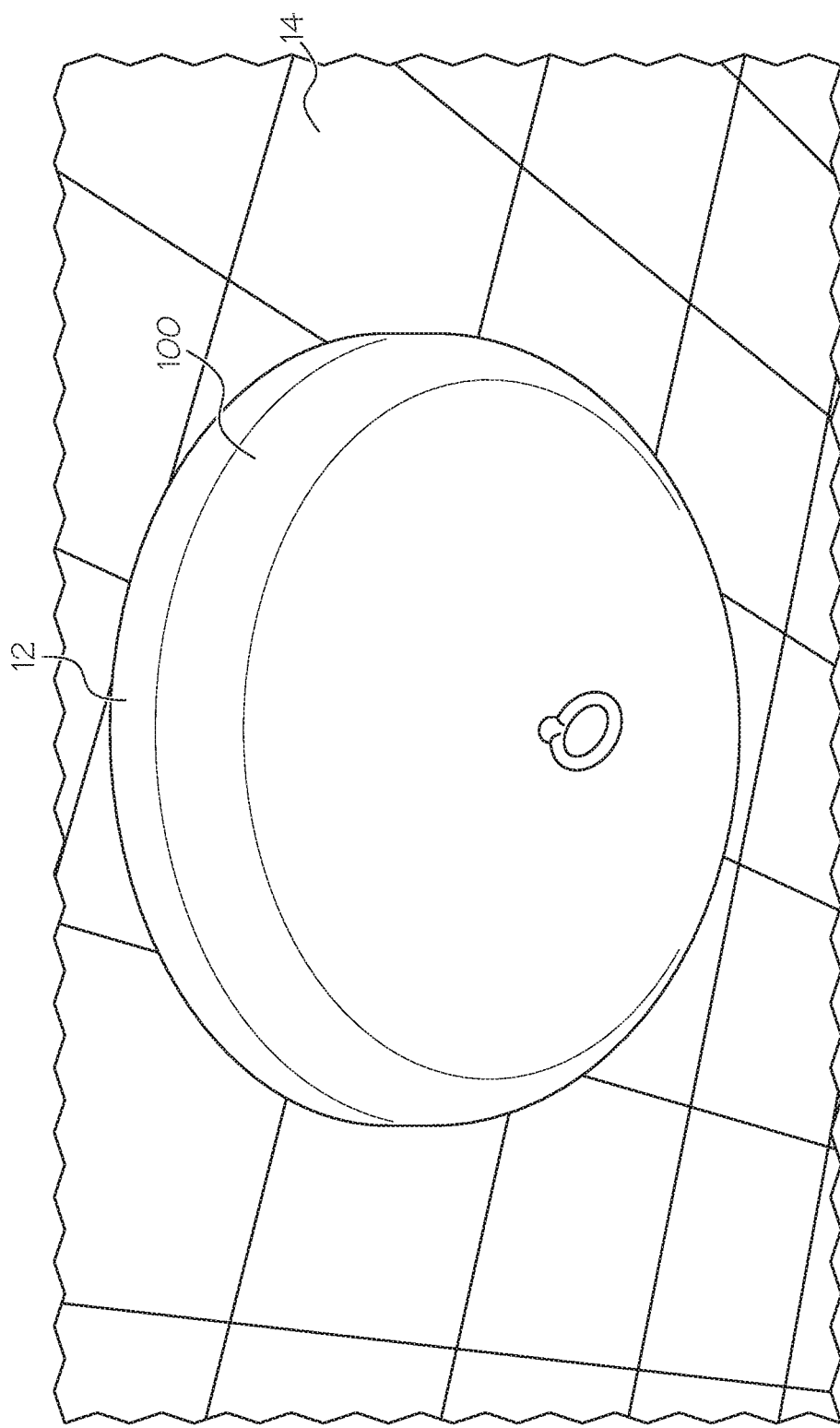
FIG. 8 is a bottom perspective view of another embodiment of a trolley of a magnetic conveyance system in accordance with the teachings of the present disclosure.

The present application is directed toward a magnetic conveyance system 10 which may be disposed in an overhead manner as shown in FIG. 1 or may be used in other horizontal or vertical orientations. As shown in FIG. 1, an embodiment of the magnetic conveyance system 10 comprises the principal components of a trolley 12 and a ferromagnetic support structure 14 (shown as a ferromagnetic ceiling 14) upon which trolley 12 is operable to translate in any direction that is substantially parallel to a bearing surface of the support structure 14. As further shown in FIGS. 1 and 2, trolley 12 comprises one or more attractor cells 16 mounted on a trolley frame 18. FIG. 8 illustrates an embodiment wherein trolley 12 includes a cover 100 which protects the trolley frame 18 (see FIGS. 1 and 2), attractor cells 16 (see FIGS. 1 and 2), and other components.

Figure 2:
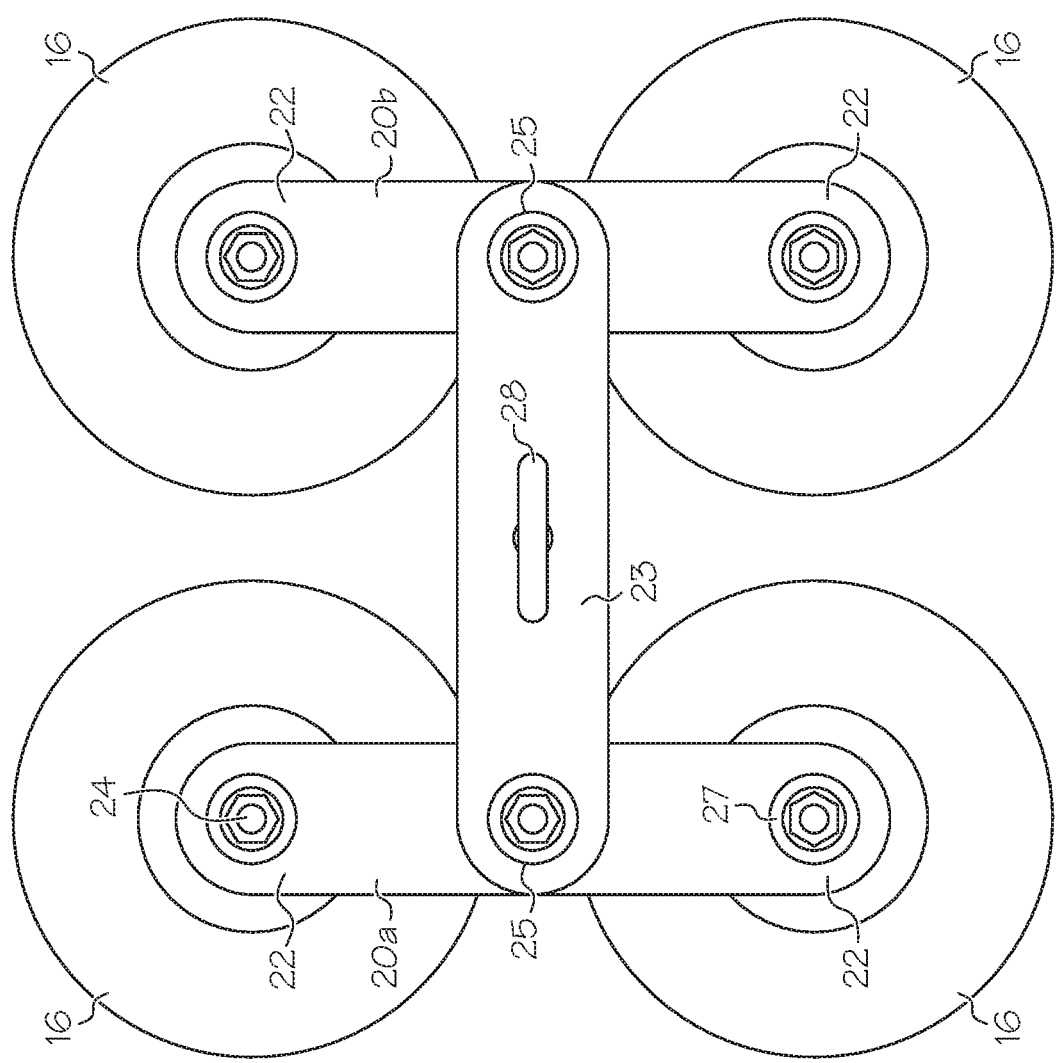
FIG. 2 is a bottom view of another embodiment of a trolley of a magnetic conveyance system in accordance with the teachings of the present disclosure.

FIGS. 1 and 2 show an embodiment of trolley frame 18 including plate 20 having a plurality of arms 22 upon which an attractor cell 16 may be mounted. FIG. 1 shows an embodiment of plate 20 having three arms 22 upon each of which an attractor cell 16 is mounted. FIG. 2 illustrates a similar embodiment wherein plate 20a includes two arms 22 and plate 20b also includes two arms 22, wherein each arm 22 has an attractor cell 16 operably connected thereto. The embodiment of FIG. 2 includes two plates 20a and 20b being connected by a link member 23 using one or more articulating connectors 25. Each articulating connector 25 may be a spring-loaded connection, a viscoelastic or elastic grommet, a bushing or other element providing one or more degree-of-freedom movement. Generally, articulating connectors 25 provide relative displacement between the two sections of plate either through a pivot connection, linear displacement, or a multi-degree of freedom connection to allow relative movement of the two plates 20a and 20b relative to link member 23 to accommodate variations in the bearing surface of the support structure. The tools and/or hanger 28 may be coupled to link member 23. Similarly, additional embodiments including more than two pairs of arms with attractor cells 16 coupled thereto as similarly described (resembling a centipede) are within the scope of the present invention. There are other similar configurations a trolley 12 that includes two or more attractor cells.

Turning back to FIG. 1, plate 20 may include arms 16 to reduce the overall weight of plate 20. However, plate 20 could be any shape such as triangular or rectangular in some embodiments. Alternatively, an embodiment not shown may include trolley frame 18 being a space-frame constructed of one or more tension or compression frame elements to further reduce weight. The ferromagnetic support structure 14 preferably provides a smooth and/or planar bearing surface with ferromagnetic properties that the attractor cells 16 will be attracted to and move upon.

FIGS. 1 and 2 show that attractor cells 16 may be coupled to trolley frame 18 with one or more fasteners 24. Moreover, as shown best in FIG. 1, fastener 24 may extend through a collar 26 that may provide a desired spacing from the trolley frame 18 to the attractor cells 16. In one embodiment, collar 26 may be made of a rigid material, or alternatively, may be a flexible or viscoelastic material that allows displacement, rotation, and/or articulation of attractor cell 16 relative to trolley frame 18. In addition, one or more elastic or viscoelastic grommets 27 (or washers) may be utilized in the connection instead of or in addition to a flexible collar to provide additional articulation at the connection between attractor cell 16 and trolley frame 18. It is preferred that attractor cell 16 is coupled to trolley frame 18 having some articulation and/or pivot capability to accommodate disruptions in the smooth and/or planar bearing surface of support structure 14. An articulating connection facilitates even distribution of loads and retaining bearing balls in the friction reducing load transferring device 30 (as described below) upon attractor cell 16 engaging a discontinuity in the bearing surface of support structure 14.

FIG. 1 also shows a hanger or tool 28 mounted on or coupled to trolley frame 18. A person of a skill in the art will appreciate that trolley frame 18 may be adapted for mounting and supporting any number of pieces of equipment now known or hereafter developed. Furthermore, an embodiment of trolley 12 (not shown) includes a hanger or tool 28 being attached directly to an attractor cell 16 without a trolley frame 18 which simplifies the design of an embodiment of the present system for supporting lightweight fixtures or other items. There are a number of various tools, machines, hangers and configurations thereof which may be utilized in the present magnetic conveyance system 10.

The trolley 12 may also incorporate load limiting devices (not shown) operable to prevent overload of the load limiting device which will not allow support of excess loads. Other embodiments (not shown) of trolley 12 may include a load sensing system and an associated alarm to indicate the trolley is overloaded; a power drive or motor system to assist lifting, lowering and traveling of objects to be conveyed; an on-board computer for automatic guidance and conveyance to a desired location; on-board lighting; associated emergency fail-safe systems; a rechargeable battery system; a wired or wireless remote control system; a braking or holding system; one or more anchor points for hoists and suspended items and devices; and other features.

Figure 3:
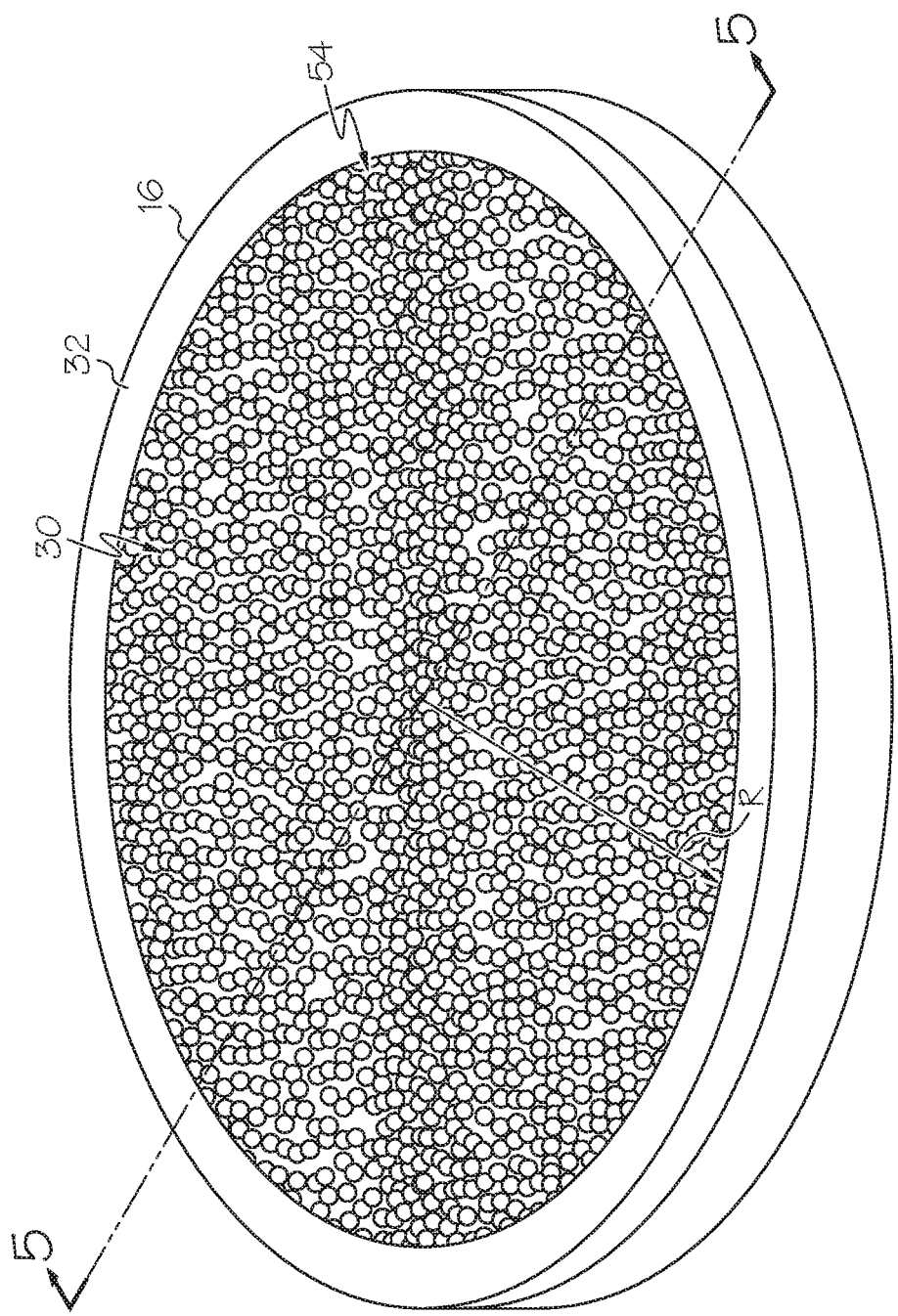
FIG. 3 is a perspective view of an attractor cell of a magnetic conveyance system in accordance with the teachings of the present disclosure.

One embodiment of the attractor cell 16 comprises two separate systems that can operate separately on a common frame, or could more typically be combined into a single unit. The first system is a magnet or magnet array of suitable strength that is attracted to the ferromagnetic support structure 14 and the second system is a friction reducing and load spreading device that is in actual contact with support structure 14. Friction reducing load spreading device 30 may support the magnet or magnet array a distance from the ceiling surface at all times. FIG. 3 illustrates one embodiment of the attractor cell 16 comprising friction reducing load spreading device 30, a magnet, magnet array, or non-magnetic member (see FIGS. 5, 6, and 13) under friction reducing load spreading device 30, contained in a housing 32. As shown in FIG. 3, friction reducing load spreading device 30 may include a bearing area defined by a radius R.

Figure 4:
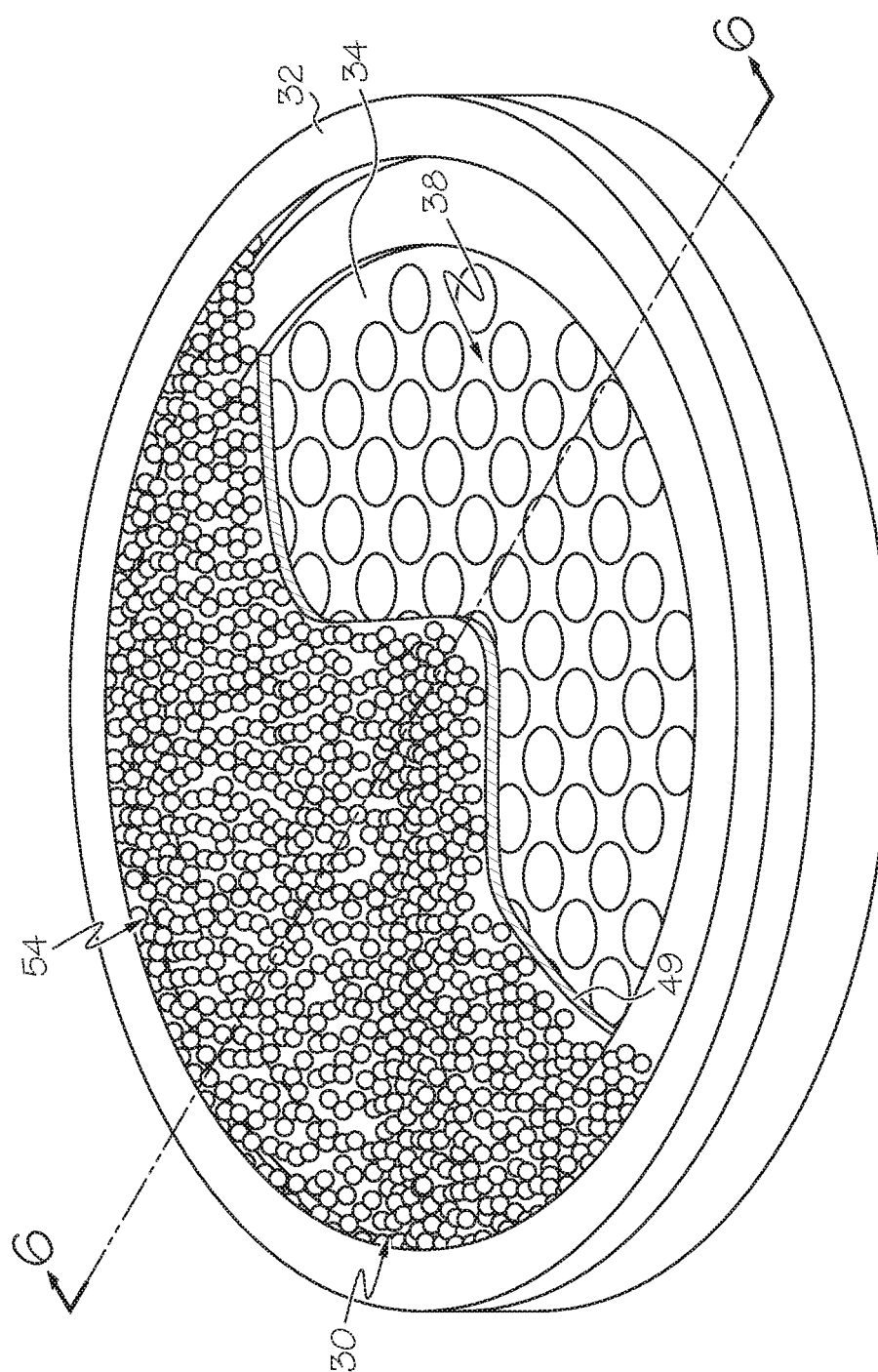
FIG. 4 is a perspective view of an attractor cell of a magnetic conveyance system in accordance with the teachings of the present disclosure.

FIG. 4 shows a similar embodiment of the attractor cell 16 illustrating the disposition of a magnet or magnet array 34 within housing 32 with a portion of friction reducing load spreading device 30 removed. The magnet or magnet array 34 may be mounted in such a way as to attract the ceiling 14 either through or immediately adjacent to friction reducing load spreading device 30. Friction reducing load spreading device 30 will be capable of providing a system with little resistance or hesitation of movement and/or turning in any lateral direction.

Figure 5:
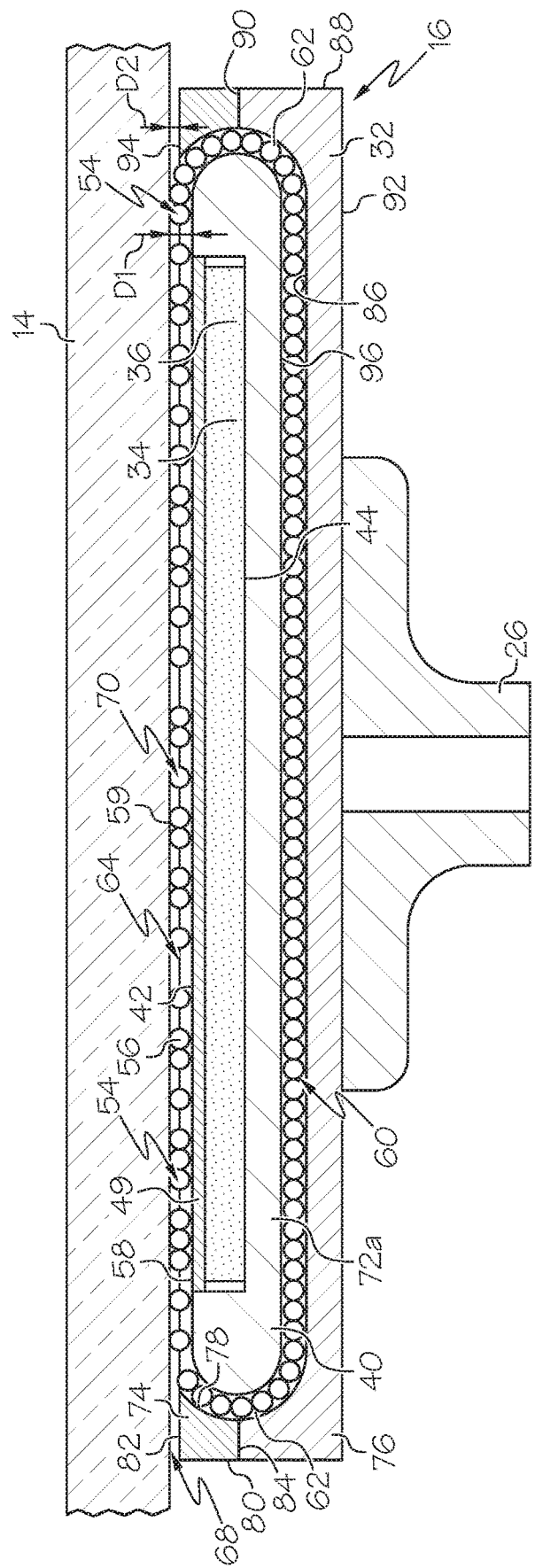
FIG. 5 is a sectional view of the attractor cell of FIG. 3 cut along the line 5-5.

The magnet or magnet assembly 34 may be constructed by employing a single magnet 36 as shown in FIG. 5. Single magnet 36 may be configured as a conventional cup-magnet that is polarized on its opposite faces and mounted in an iron, steel or other ferromagnetic holder 40 that wraps around magnet 36 from a back surface 44 toward the front surface 42 which produces an enhanced magnetic field sufficient to attract to a ferromagnetic surface. Magnet assembly 32 may also include a bearing plate 49 disposed above the magnet 36 as shown. This configuration is commonly used for a variety of holding applications and is desirable because it concentrates both poles of magnet 36 onto a single face or side and, thus amplifies the holding or attracting force applied by magnet 36. Magnet or magnet assembly 34 may also simply be a north-south magnet mounted without the holder 40 without the magnetic field enhancement. Bearing plate 49 may be made from a non-ferromagnetic metal, composite, polymer, or visco-elastic material.

Figure 6:
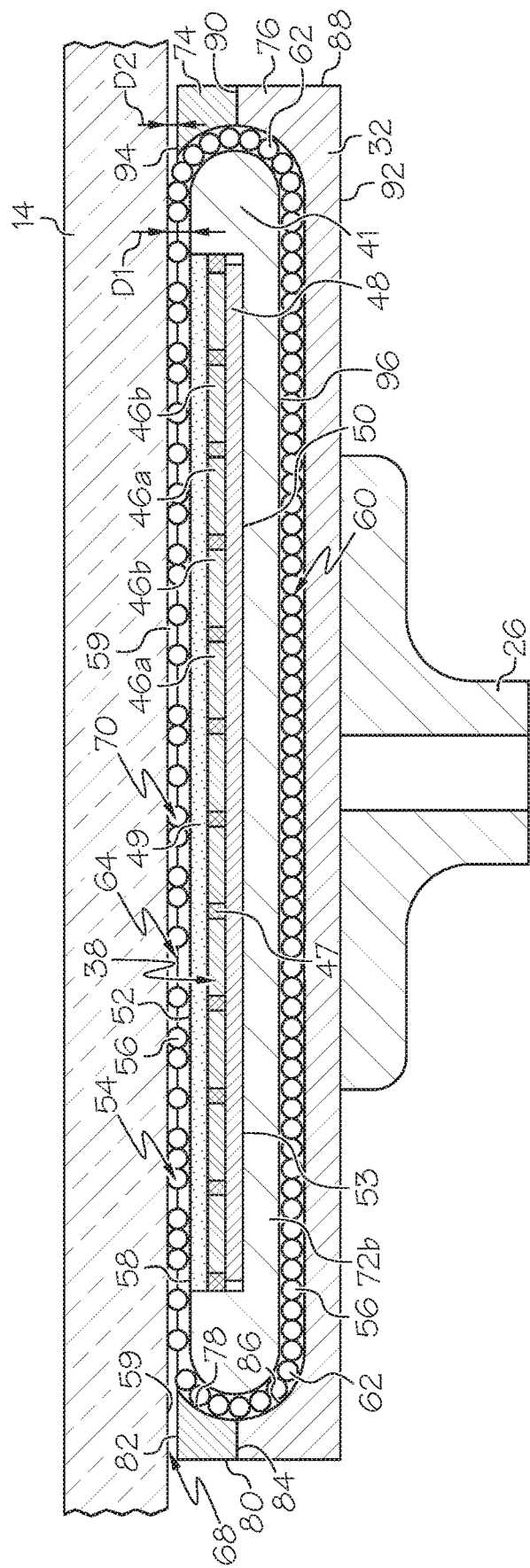
FIG. 6 is a sectional view of the attractor cell of FIG. 4 cut along the line 6-6.

FIGS. 4 and 6 illustrate another embodiment of magnet or magnet assembly 34 comprising a magnet array 38 having an arrangement of permanent magnets 46 mounted on a ferromagnetic back plate 48, for example, made from a ferromagnetic material like iron or mild steel. The permanent magnets 46 may be arranged on back plate 48 with their pole faces reversed on adjacent magnets and mounted in a housing 41. Magnetic array may include spacers 47 disposed between magnets and a bearing plate 49 to provide bearing surface and/or hold magnets 46 in place. For example, as shown in FIG. 6, permanent magnets 46*a* have their positive pole upward and permanent magnets 46*b* have their negative pole upward. Back plate 48 then functions much like the iron cup holder 40 of FIG. 5 for the single magnet 36. Back plate 48 carries the magnetic fields of a back side 50 of the magnetic array 38 into the oppositely poled adjacent magnets and concentrates the holding force on a front side 52 of magnetic array 38 that results in the front side 52 being a working side. This configuration creates a high magnetic flux density on front side 52. Magnet array 38 and disposition of magnets 44 can be adapted and configured as needed to provide a desired holding strength and/or attraction force.

A back side surface 53 of back plate 48 may have little or no sign of magnetism as the magnetic field has been completely absorbed and turned toward the front side 52 or working side. The selection of the size, shape, thickness, and strengths of magnets 44 and the material and thickness of back plate 48 may be selected on one or more highly variable factors to provide a desired holding strength and/or attraction force. For example, depending on the specific application, selection of elements would be based, at least, on the following considerations: the working load to be handled, any desired or required safety factor, the extent of an air gap required by attractor cell 60, and the magnetic field pattern reach. In general, the strength of magnet 36 or magnets 44 of magnet array 38, when mounted and assembled, must be sufficient to support the desired or required design load through an air gap with a desired/required safety factor. Moreover, the thickness of the back plate 48, whether iron, steel, other steel alloy, or other ferromagnetic material, may be sufficient to not become magnetically saturated. If the back plate 48 becomes magnetically saturated, the magnetic field could extend outward of the back plate 48, which may be undesirable in some applications.

Attractor cell 16 is configured to provide the ability to undergo multi-directional movement in a plane direction parallel or substantially parallel to the supporting ferromagnetic support structure 14, for example ceiling 14. As such, friction must be reduced between the magnets 36 or magnetic array 38 and support structure 14 using friction reducing load spreading device 30. In general, friction reducing load spreading device 30 is any configuration of components which reduce the friction force required to slide trolley 12 upon a bearing surface of support structure 14 and transfer the load created by the magnetic attraction force to the support structure. In the embodiment shown in FIGS. 5, 6, 13, 14B, and 15B the friction reduction will be accomplished with bearing balls 56 disposed between housing 32 and the support structure (ceiling) 14. In some embodiments, bearing balls 56 provide friction reducing properties and the ability to change directions of motion without the need of a turning system. In other embodiments of friction reducing load spreading device 30 may include one or more pads of a material that reduces the friction between the housing 32 and/or magnet 34, and the support structure 14, such as reduced or low friction polymers. Other alternatives include one or more casters and/or wheels disposed between the trolley frame and the support structure, mechanically steerable wheels, or one or a plurality of single ball transfers described in more detail below.

Four examples of friction reducing load spreading device 30 that may be utilized with the system 10 of the present invention in order to reduce friction resisting multi-direction movement of the trolley 12 are described in detail herein. However, additional configurations within the spirit of the ball support devices described herein are also within the scope of the present invention. One embodiment (not shown) is a conventional single ball-transfer device which is commonly available in a variety of configurations. They provide a single load carrying ball partially presented above a housing within which a plurality of smaller bearing balls are rolling and re-circulating to support the larger exposed ball and to permit it to roll in any direction with low resistance.

These conventional single ball-transfers support a load only at a single point of contact on the main load carrying ball, resulting in a single point of contact on the supporting surface that is very small. This configuration produces a high concentration of pressure over a very small area of the bearing surface of the support structure. Although conventional single-ball transfers are capable of supporting fairly heavy loads, they can exert damaging forces on the bearing surfaces while rolling across them. The pressure exerted at the point of contact against a flat contact surface can be crushing at equivalent to several thousand pounds per square inch, which is sufficient to forge a groove into a soft steel plate. Even if the main ball is polymeric, the contact pressure and force exerted remains high for large loading.

Accordingly, the support structure, when using the conventional single-ball device needs to be at least as hard as the main ball of the conventional ball-transfer or the loads must be very low to prevent damage to the surface rolled against. This requirement makes the conventional single-ball device useful in very light duty or light load-bearing type systems because the magnetic attraction of the attractor cell 16 needn't be so great as to cause unusual stresses or damage to the support structure 14 from the pressure of the ball transfers employed. Such applications may include, but are not limited to lightweight objects such as lamps and other lightweight fixtures.

FIGS. 3, 4, 5, 6, 13, 14A, 14B, 15A, and 15B illustrate embodiments of friction reducing load spreading device 30 being an open-ball-transfer device ("OBT") 54. OBT 54 will be configured optimally when its bearing surface is shaped as a round, fully radiused disc. However, other shapes are within the scope of the invention. As shown in FIGS. 5 and 6, OBT 54 includes a plurality of inter-contacting bearing balls 56 that separate and create an air gap 68 between a bearing surface 58 of attractor cell 16 and bearing surface 59 the support structure 14. OBT 54 also includes a reservoir 60 for storing a volume of bearing balls 56 and an annular channel 62 which allows the bearing balls 56 to travel from an engaged position 64 at an interface 70 between bearing surface 59 of support structure 14 and bearing surface 58 of attractor cell 16. Bearing balls 56 are not contained or held in relative position to one another and may roll freely in any direction. The quantity or density of bearing balls 56 positioned at interface 70 between bearing surface 58 of attractor cell 16 and bearing surface 59 of support structure 14 is very high and is maintained at that density by the fact that they are held in a closed recirculating system comprising the plurality of bearing balls 56 disposed in engaged position 64, reservoir 60 and channel 62, wherein the system has a fixed volume. Movement of bearing balls 56 is generally caused by forced displacement of adjacent balls 56 in the fixed volume.

As shown in FIGS. 5 and 6, an embodiment of reservoir 60 has a depth to accommodate one row of bearing balls 56 that allows, for any direction of travel of the attractor cell 16, bearing balls 56 to follow a flattened circular flow path. Reservoir 60 and channel 62 have a clear dimension slightly greater than the diameter of the bearing balls 56. This configuration is preferable as it requires less force to displace and cause the movement of the bearing balls 56 in reservoir 60 and channel 62 to circulate across the engaged position 64. Alternatively, other embodiments (not shown) may be utilized which include reservoir 60 having a volume sufficient to house more than one layer of bearing balls. Yet another embodiment may include reservoir 60 being an annular groove disposed in an inner surface 78 or 86 of housing 32, wherein the annular groove has a cross-sectional shape and volume sufficient to store a sufficient number of bearing balls 56 so as to provide a sufficient supply of bearing balls 56 to bearing surface 58 of attractor cell 16. This eliminates the need to suspend a load transferring member 72 within the housing 32 like the embodiments shown in FIGS. 5 and 6.

Figure 13:
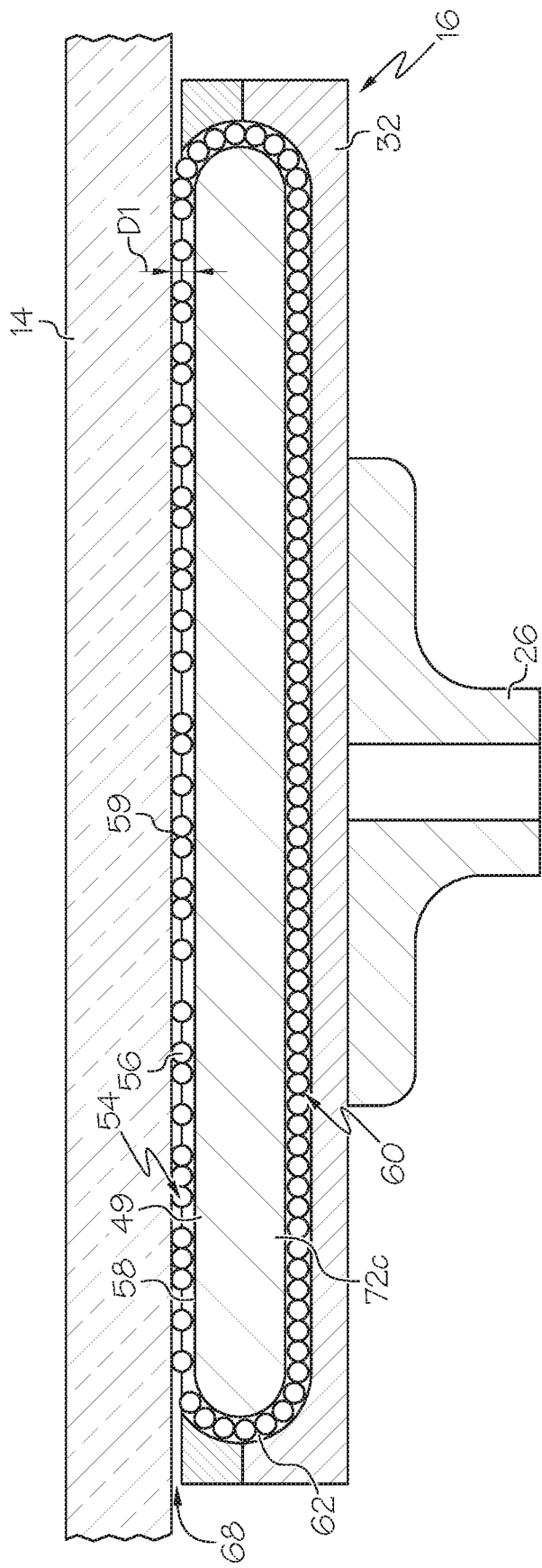
FIG. 13 is a section view of an alternative embodiment of the attractor cell of FIG. 5 showing a friction reducing load spreading device that is non-magnetic.

As shown in FIG. 5, the magnet 36 and holder 40 comprise a load transferring member 72a. As shown in FIG. 6, the plurality of magnets 46, back plate 48 and front plate 49 comprise another embodiment of load transferring member 72b. An alternative embodiment shown in FIG. 13 includes load transferring member 72c being a non-magnetized metal or polymer member. Each load transferring member 72a, 72b and 72c have a bearing surface 58. As shown in FIGS. 5, 6 and 13, load transferring member 72a, 72b, and 72c may be mounted within housing 32 so that bearing surface 58 is a distance "Dl" from the bearing surface 59 of the support structure 14.

As shown in FIGS. 5 and 6, housing 32 may comprise an upper housing member 74 and a lower housing member 76 that are removably or permanently coupled together. Upper housing member 74 comprises an inner surface 78, an outer surface 80, a top surface 82, and a bottom surface 84. Lower housing member 76 includes an inner surface 86, an outer surface 88, a top surface 90, and a bottom surface 92. In FIGS. 5 and 6, an embodiment of housing 32 includes the outer surfaces 80 and 88 defining a substantially circular and cylindrical shape. However, other shapes are within the scope of the present invention. Inner surfaces 78 and 86 align at the transition between upper and lower housing members 74 and 76 as the width of the bottom surface 84 of the upper housing member 74 is substantially similar to a width of the top surface 90 of the lower housing member 76 at the transition. As further shown, inner surfaces 78 and 86 are generally curved in the portions of the inner surfaces 78 and 86 that are opposite outer surfaces 80 and 88. FIGS. 5 and 6 show this curvature being an arch and it may be substantially a semi-circle. These curved shapes allow for smooth flow of bearing balls 56 within channel 62 and reservoir 60 formed in part by the inner surfaces 78 and 86 of the upper and lower housing members 74 and 76. As further shown in FIGS. 5 and 6, inner surface 78 of upper housing member 74 curves inwardly thereby creating a ramped transition portion 94 of upper housing at the intersection of inner surface 78 and top surface 82 of upper housing member 74.

This configuration of housing member 32 allows load transferring member 72a or 72b to be coupled to a portion of an inner surface 86 of lower housing member 76 opposite the bottom surface 92. Load transferring member 72a or 72b may be coupled to housing 32 by any number of fasteners and/or spacers sufficient to carry the required load for a particular attractor cell 16 and accurately position the load transferring member 72 within housing 32. However, the fasteners and/or spacers are preferably distributed within housing 32 to minimally impede the flow of bearing balls 56 within reservoir 60. Load transferring member 72a or 72b is suspended a distance inside the inner surface 86 of lower housing member 76. As shown in FIGS. 5 and 6, load transferring member 72a or 72b and inner surface 86 may have complimentary shapes so that when load transferring member 72a or 72b is disposed in housing 32, reservoir 60 and channel 62 of substantially constant dimension are formed between inner surface 86 and an outer surface 96 of the load transferring member 72a or 72b. The shapes of outer surface 96 of load transferring member 72a or 72b and inner surface 86 of lower housing member 76 are preferably curved so as to provide smooth flow channels for the bearing balls 56. Load transferring member 72c of FIG. 13 may be similarly arranged.

In operation, bearing balls 56 in the engaged position 64 roll between the bearing surface 58 of attractor cell 16 and bearing surface 59 of support structure 14 to reduce friction and resistance to lateral movement. The bearing balls 56 leaving the engaged position 64 from between the bearing surfaces 58 and 59 wherein they engage ramped transition portion 94 of upper housing member 74 which guides the bearing balls 56 to roll off and fall, are pushed by the succeeding or following exiting balls into the channel 62 and reservoir 60. The bearing balls 56 are pushed along freely under no load until, by virtue of volume displacement, they circulate through the channel 62 and reservoir 60 and are thus re-deposited in engaged position 64 between bearing surfaces 58 and 59. The circulated bearing balls 56 are then available to again reduce friction and resistance to motion at the interface 70. This arrangement permits the balls to continuously circulate from the engaged position 64 through channel 62 and reservoir 60 and back to the engaged position 64 automatically and continuously regardless of the direction of motion or changing of direction of OBT 54.

The bearing balls 56 employed in OBT 54 are preferably plastic, Delrin or nylon to reduce wear and marking of the ceiling surface and because they have no magnetic properties themselves. Other materials, including metals such as aluminum, stainless steel, or even softer plastics such as Teflon or even hard rubber balls could work depending on the application. It will be appreciated that load transfer member 72a, 72b, and 72c may include a bearing surface 58 having an appreciable area wherein a significant portion of the area is covered with bearing balls 56. Thus, depending upon the effective bearing area and the diameter and density of bearing balls 56, the bearing load per ball could be as low as a few ounces when used in a system that might support 500 lbs. or more. This configuration allows trolley 12 to translate on a support structure 14 such as a ferromagnetic ceiling panel that has an aesthetic smooth surface either covered in paint or a polymeric surface coating without causing excessive wear or damage to the ceiling finish.

Figure 14A:
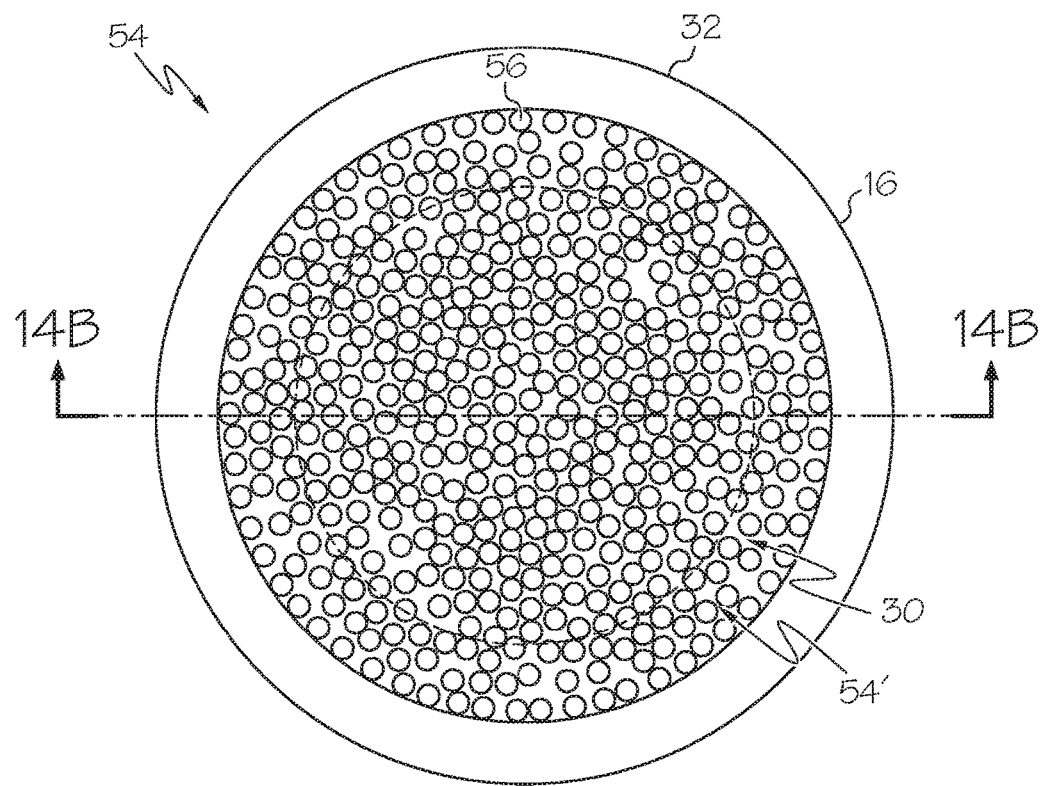
FIG. 14A is a top view of an embodiment of a friction reducing load spreading device of a magnetic conveyance system in accordance with the teachings of the present disclosure.
Figure 14B:
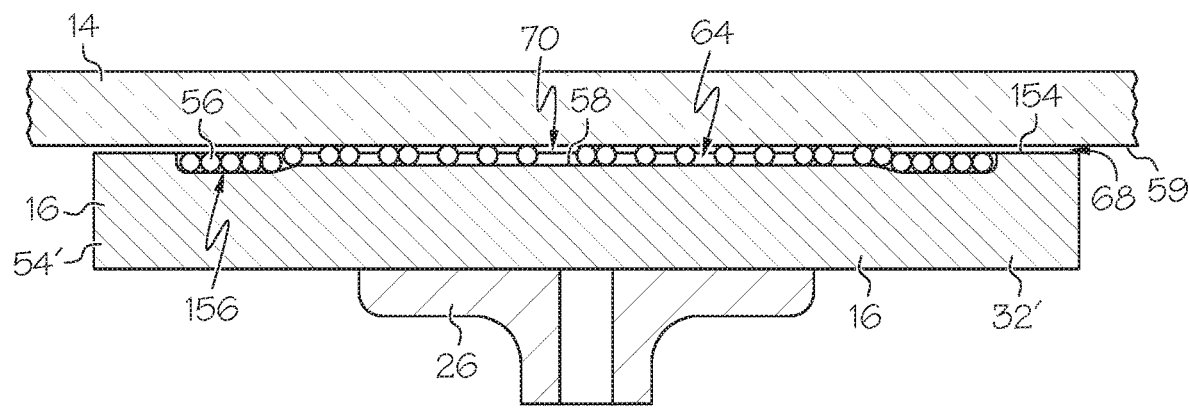
FIG. 14B is a sectional view of the friction reducing load spreading device of FIG. 14A cut along the line 14-14.

FIGS. 14A and 14B illustrate an alternative embodiment of friction reducing load spreading device 30 being OBT 54' that includes a plurality of bearing balls 56 disposed in a raised engagement position 64 to engage bearing surface 59 of support structure 14 and a slightly lowered annular reservoir 156 surrounding the engagement position 64 of the bearing balls 56. Bearing balls 56 in engagement position are disposed in engagement position 64 to provide an air gap 68 between a top surface 154 of housing 32' and bearing surface 59 of support structure 14. Thus, as bearing balls 56 in engagement position 64 translate relative to the housing 32' upon the housing 32' sliding relative to support structure 14, bearing balls 56 exiting the engagement position 64 similarly engage and force the displacement of the bearing balls 56 in reservoir 156, which causes a circulation and replacement of bearing balls 56 into and out of engagement position 64 due to displacement of the bearing balls 56 in a fixed volume.

Figure 15A:
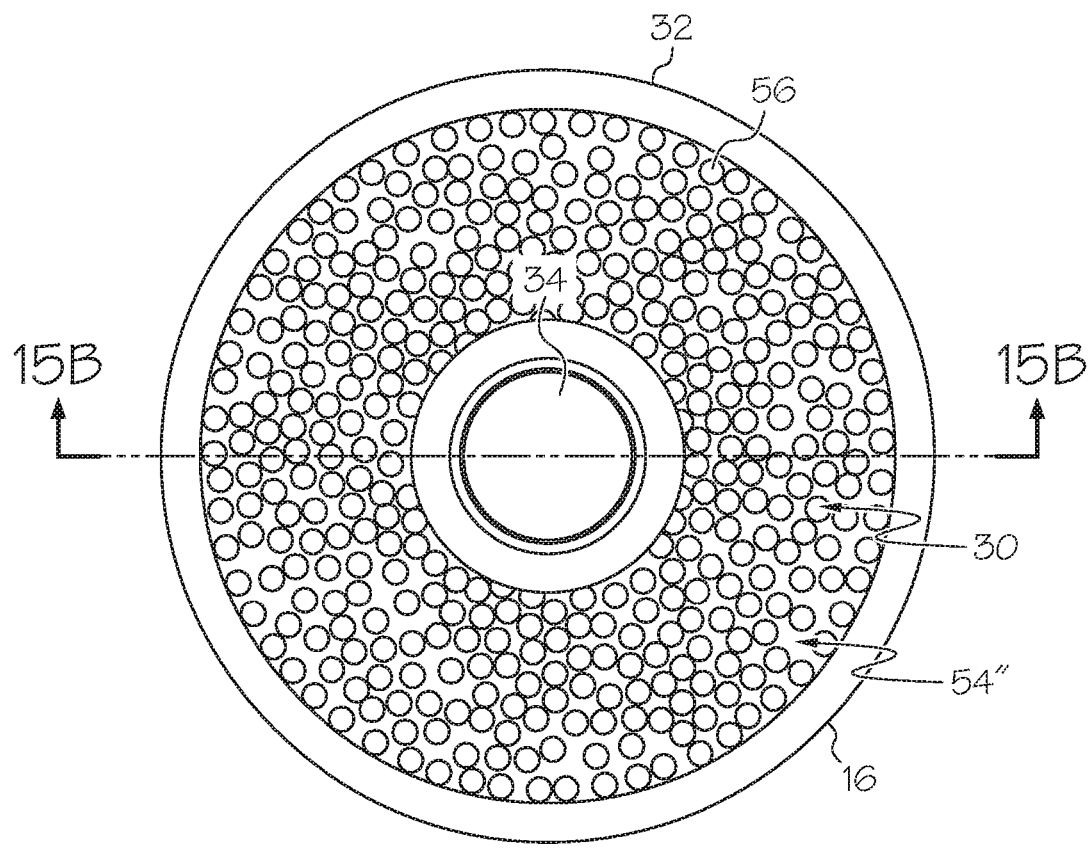
FIG. 15A is a top view of another embodiment of a friction reducing load spreading device of a magnetic conveyance system in accordance with the teachings of the present disclosure.
Figure 15B:
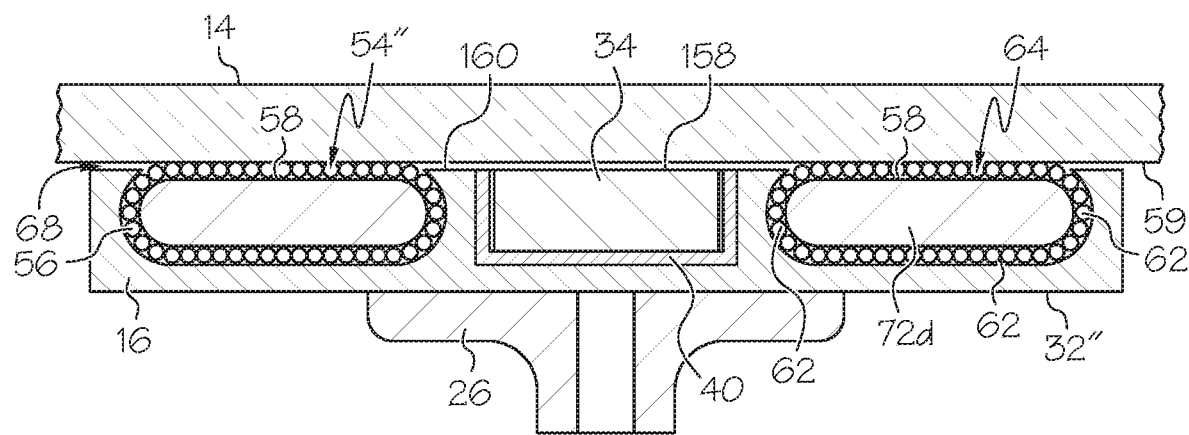
FIG. 15B is a sectional view of the friction reducing load spreading device of FIG. 15A cut along the line 15-15.

Another alternative embodiment shown in FIGS. 15A and 15B includes friction reducing load spreading device 30 having an OBT 54" wherein a load transferring member 72d is an annular ring disposed and suspended in housing 32". A magnet or magnet assembly 34 may be disposed inside the inner circle of the load transferring member 72d. In other words, load transferring member 72d may surround the magnet or magnet assembly 34. As best shown in FIG. 15B, magnet or magnet assembly 34 may be held within a housing 40 and/or received into housing 32". Bearing balls 56 are similarly disposed in OBT 54" wherein they engage bearing surface 59 of support structure 14 in engagement position 64 and circulate through reservoir 60 and through channels 62 as the attractor cell 16 translates relative to support structure 14. Bearing balls 56 may be similarly disposed to define an air gap 68 between a top surface 158 of the magnet and/or a top surface 160 of housing 32". This embodiment facilitates placing the surface of the magnet 34 closer to the bearing surface 59, thereby increasing the effective magnetic force exerted upon support structure 14 by the magnet 34.

The basic functional criteria of an OBT is that a reservoir of bearing balls is in communication with the engagement position of the bearing balls through proximity or a channel so that movement of the balls results in a circulation of the bearing balls into and out of reservoir during translation of the attractor cell in any direction. Further, the bearing surface 58 of the load transferring member 72 (FIGS. 5, 6, 13 and 15B) or the housing 32' (FIG. 14B) in the engagement position should be smooth and free from any obstructions to facilitate ball movement.

Friction reducing load spreading device 30 can be employed in various ways to reduce friction and resistance to motion in the present conveyance system 10. One is by incorporating friction reducing load spreading device 30 into an attractor cell 16 as described above and mounting an attractor cell 16 or multiple attractor cells (see FIGS. 1 and 2) on the trolley frame 20. Smaller attractor cells 16 and more of them is a preferred method of compensating for irregularities in surface 59 of support structure (ceiling) 14. The attractor cells 16 are designed to have some degree of articulation from horizontal provided by its mounting method on the trolley frame 20 to help alleviate issues resulting from inconsistencies in the flatness integrity of the ceiling surface. As described above, when multiple attractor cells 16 are being employed, the multi-degree articulation of each attractor cell relative to the others is preferable.

Figure 7:
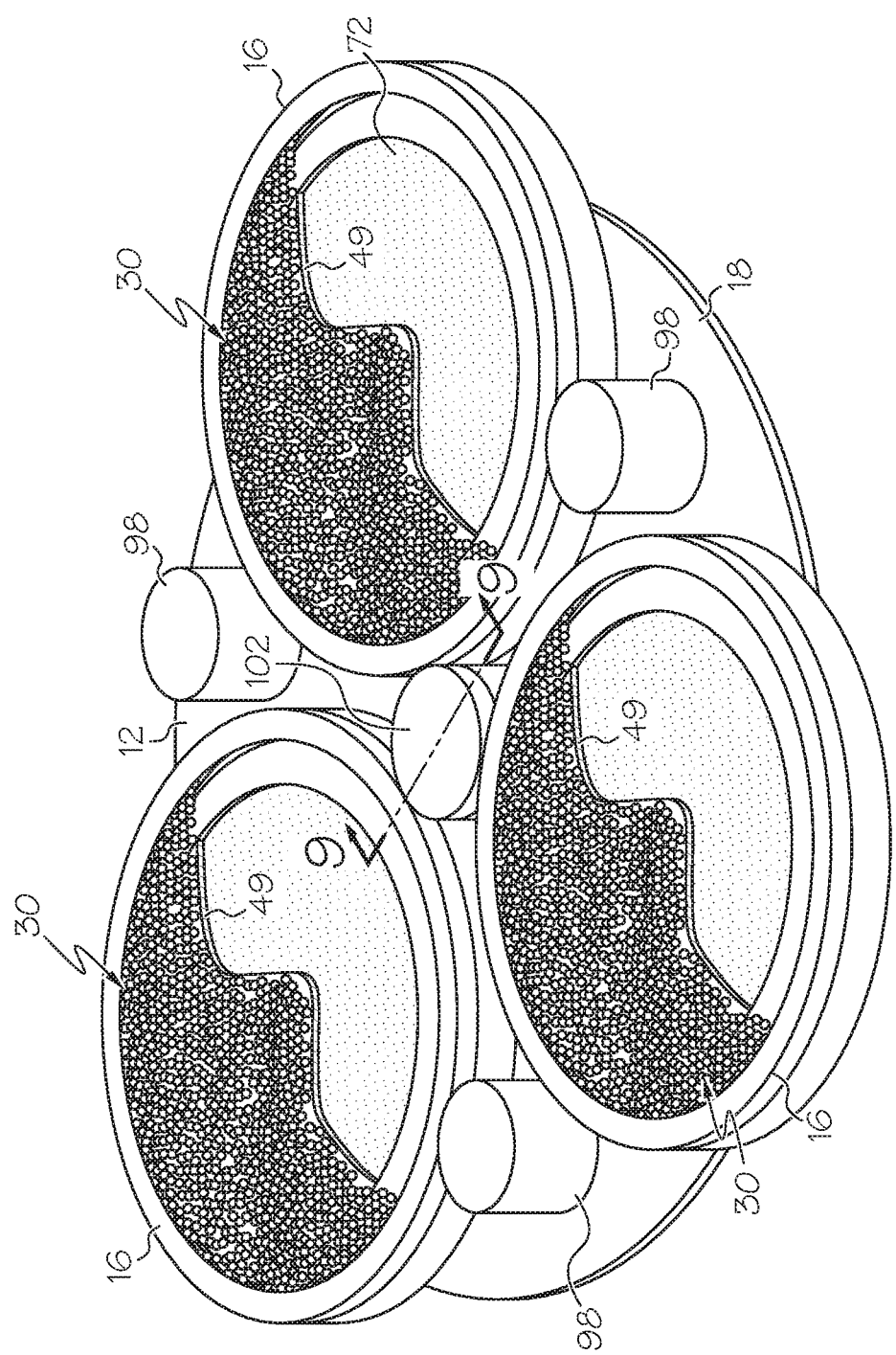
FIG. 7 is a top perspective view of another embodiment of a trolley of a magnetic conveyance system in accordance with the teachings of the present disclosure.

FIG. 7 illustrates another embodiment of trolley 12 that includes a trolley frame 18 having a plurality of distinct magnets or magnet arrays 98 disposed between and/or adjacent to the plurality of attractor cells 16. In this embodiment attractor cells 16 may include the load transfer member 72 including magnet 36 (FIG. 5) or magnet array 38 (FIG. 6). Alternatively, the attractor cells may include the load transfer member 72 being simply a non-magnetic plate and friction reducing load spreading device 30 with no magnetic attraction to only provide a reduced-friction load transfer to support structure 14 wherein only magnets or magnet arrays 98 provide the magnetic attraction force.

A sealing device (not shown), either active or inactive, could be incorporated into the top surface 82 of upper housing member 74. The sealing device may close the air gap 68 between housing 32 and support structure 14, thus sweeping away and preventing any intrusion of dirt into friction reducing load spreading device 30 and/or OBT 54 to prevent wear from contamination occurring. The sealing device may also help contain bearing balls 56 and prevent them from exiting the system in the event of a discontinuity in bearing surface 59 of support structure 14. Additionally, another embodiment not shown may include bottom surface 92 of the lower housing member 76 having open ports with an open mesh covering (not shown) on the ball side to allow the discharge of dirt and foreign particles through the open mesh due to down draw from gravity without allowing the bearing balls 56 to fall through. These additional configurations may provide a self-cleaning system at a low cost. Active systems could also be incorporated that would pass a cleaning belt or disc across the back surface of the reservoir side of the recirculation chamber that would wipe the bearing balls clean periodically. Other air and vacuum systems could also be incorporated to accomplish cleaning if needed.

Figure 9:
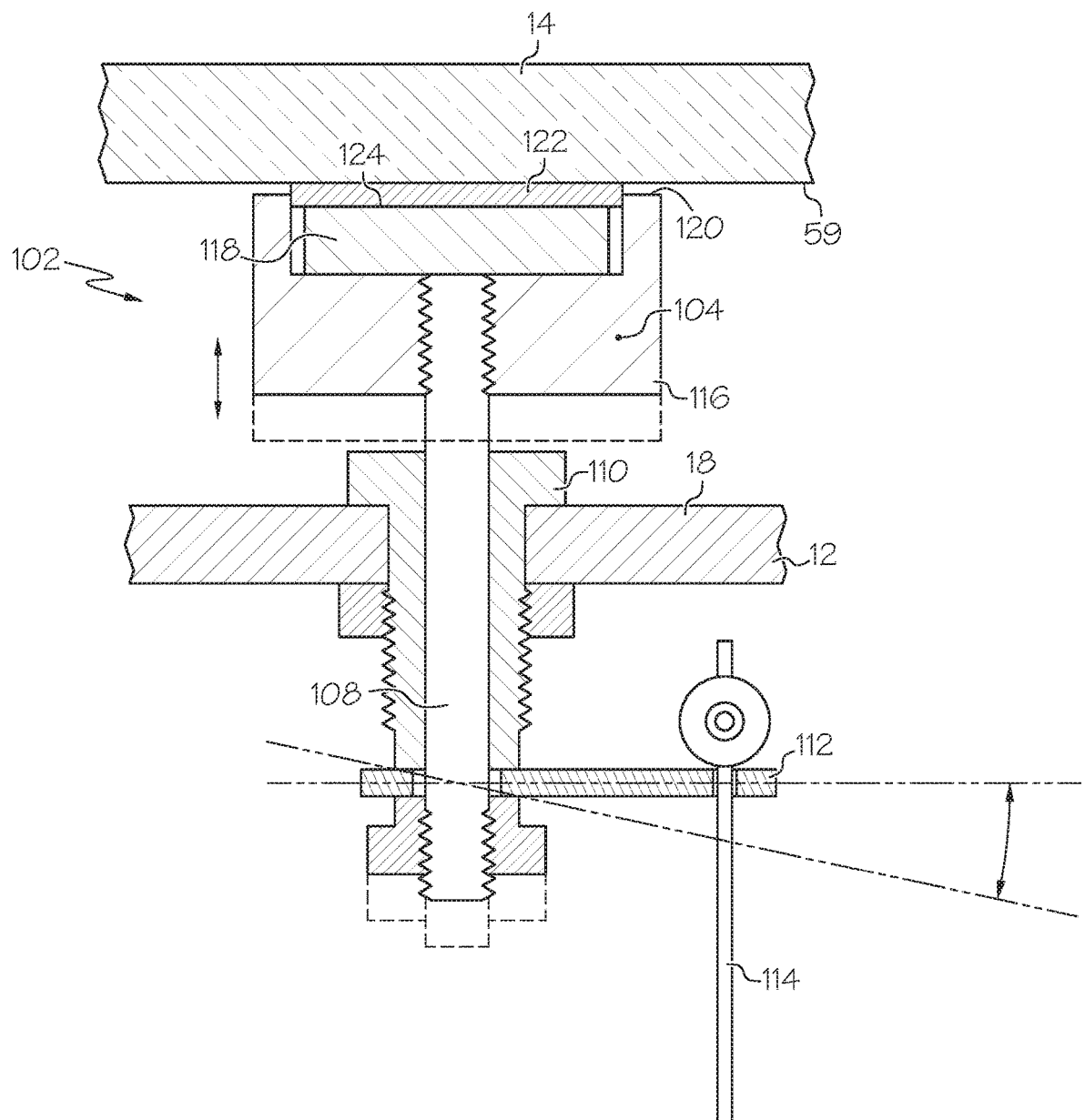
FIG. 9 is a section view of an embodiment of a brake of the trolley of FIG. 7 cut along the line 9-9.

Trolley 12 may include additional features like a brake 102. FIG. 9 illustrates one embodiment of a brake 102 which may be incorporated into trolley 12. FIG. 9 show brake 102 including a brake magnet assembly 104, a shaft 108 having one end coupled to magnet assembly 104, when shaft 108 is moveable within a sleeve 110 that is coupled to the trolley frame 18, a brake lever 112 operably connected to shaft 108 opposite the magnet assembly 104, a brake cable 114 coupled to the brake lever 112, and a brake control mechanism (not shown) for pulling or releasing the brake cable. As shown in FIG. 9, sleeve 110 may include a flange and a threaded outer surface wherein a nut engages the threads and may be tightened to secure sleeve 110 onto trolley frame 18. Shaft 108 may also have a threaded end opposite magnet assembly 104 wherein a nut engages the threads and may be tightened to secure shaft 108 within sleeve 110. Magnet assembly 104 may include a housing 116, a magnet 118 disposed on or received into a top surface 120 of the housing 116, a brake pad 122 disposed on an exterior face 124 of magnet 118 to increase the lateral friction resisting lateral movement of the trolley 12 on the support structure 14. Brake pad 122 may be elastic, viscoelastic, or other similar material. One embodiment includes brake pad 112 being rubber. Brake control mechanism may be a mechanical lever similar to those used on bicycles and wheel chairs, a servo motor mechanism, or other mechanical or motorized mechanism.

In operation, a pull on brake cable 114 by a brake control mechanism causes either a linear displacement or a rotation of brake lever 112 which effectuates a downward translation of shaft 108 and magnet assembly 104 relative to sleeve 110 thereby disengaging the brake pad 122 from bearing against bearing surface 59 of support structure 14. Thus, trolley 12 is free to move in any direction substantially parallel to bearing surface 59 of support structure 14. To apply brake 102, the brake control mechanism is caused to release the cable, wherein the magnetic force of magnet 118 is attracted to the ferromagnetic support structure 14 thereby causing translation of shaft 108 and magnet assembly 104 relative to sleeve 110 toward and ultimately bearing against the bearing surface 59 of support structure 14. Other configurations of braking systems having a similar effect are within the scope of the present invention.

One or more embodiments of the trolley 12 may also include an automated drive system (not shown). Such an automated drive system may include a drive wheel engaging the bearing surface 59 of support structure 14 that may be driven by one or more motors, such as servo motors. The automated drive system may include a wired or wireless control system which allows a user to control the movement and direction of the present conveyance system.

Further, one or more embodiments of the trolley 12 may include an overload protection or prevention devices (not shown). These devices may incorporate a load calculating device such as a scale or other device wherein upon the application of a certain load applied, an alarm may sound or the system may engage a brake to prevent movement of the load. Alternatively a fuse member may be incorporated which fails upon the application of too great of a load, thereby rendering the present conveyance system inoperable. A number of notices, alarms, and/or measuring systems are within the scope of the present invention.

The support structure 14 (the ceiling as shown in FIGS. 1, 8, 10 and 11) provides the primary functionality of being ferromagnetic and providing a substantially smooth and/or planar surface over which trolley 12 may translate in any direction substantially parallel to the smooth surface. Support structure 14 also serves as an element in the load bearing structure of the building from which objects can be suspended and conveyed using the present conveying system 10. The support structure 14 will generally have to include a strong ferromagnetic material or property proximate the outer (or bearing) surface 59. Mild steel has been successfully tested, but a more proper alloy that can withstand the constant transitioning from magnetized to non-magnetized, as the trolley moves across the surface without becoming residually magnetized itself, may serve better. One such material may be cold rolled non grain oriented silicone steel ("CRNGO"), as it is produced for its soft magnetic (reluctance to remain magnetized) characteristics. However, the present invention is not limited to a certain material and any ferromagnetic material may be implemented.

Figure 10:
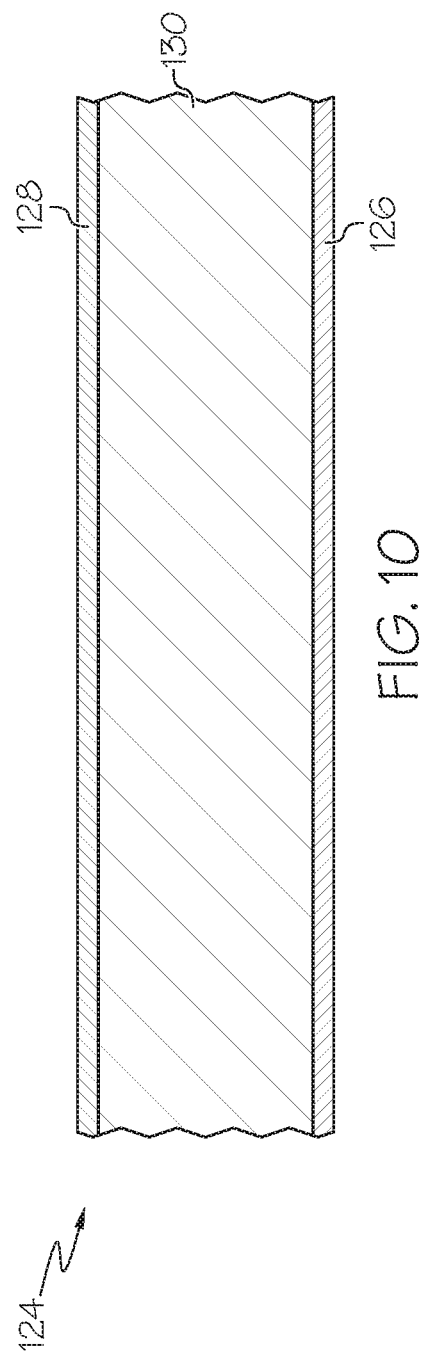
FIG. 10 is a side view of an embodiment of a ceiling panel of a magnetic conveyance system in accordance with the teachings of the present disclosure.
Figure 11:
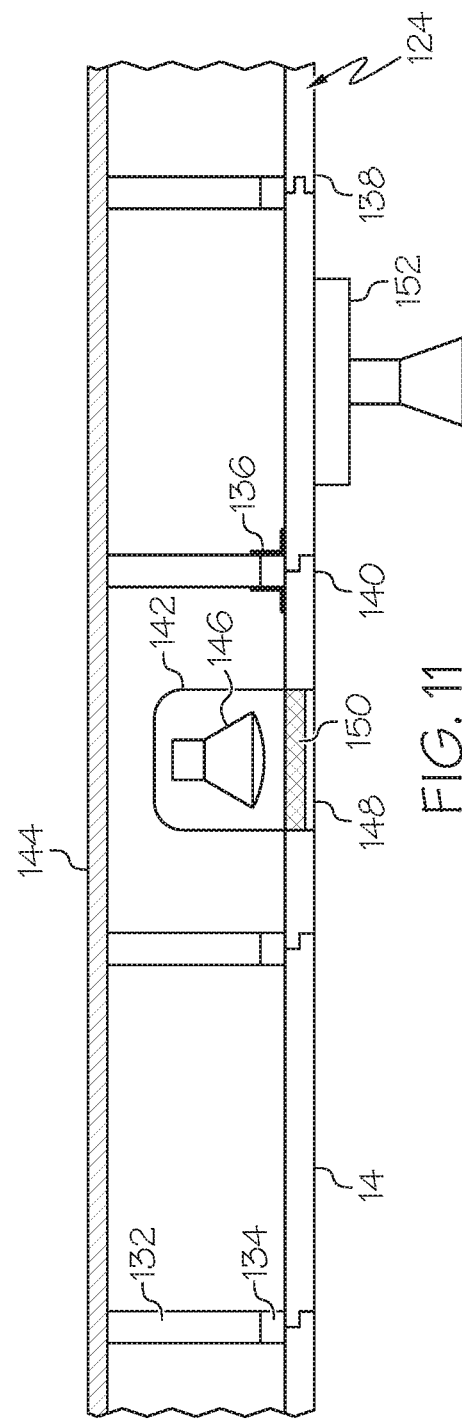
FIG. 11 is a section view of a ceiling system of the magnetic conveyance system of FIG. 12 cut along the line 11-11.
Figure 12:
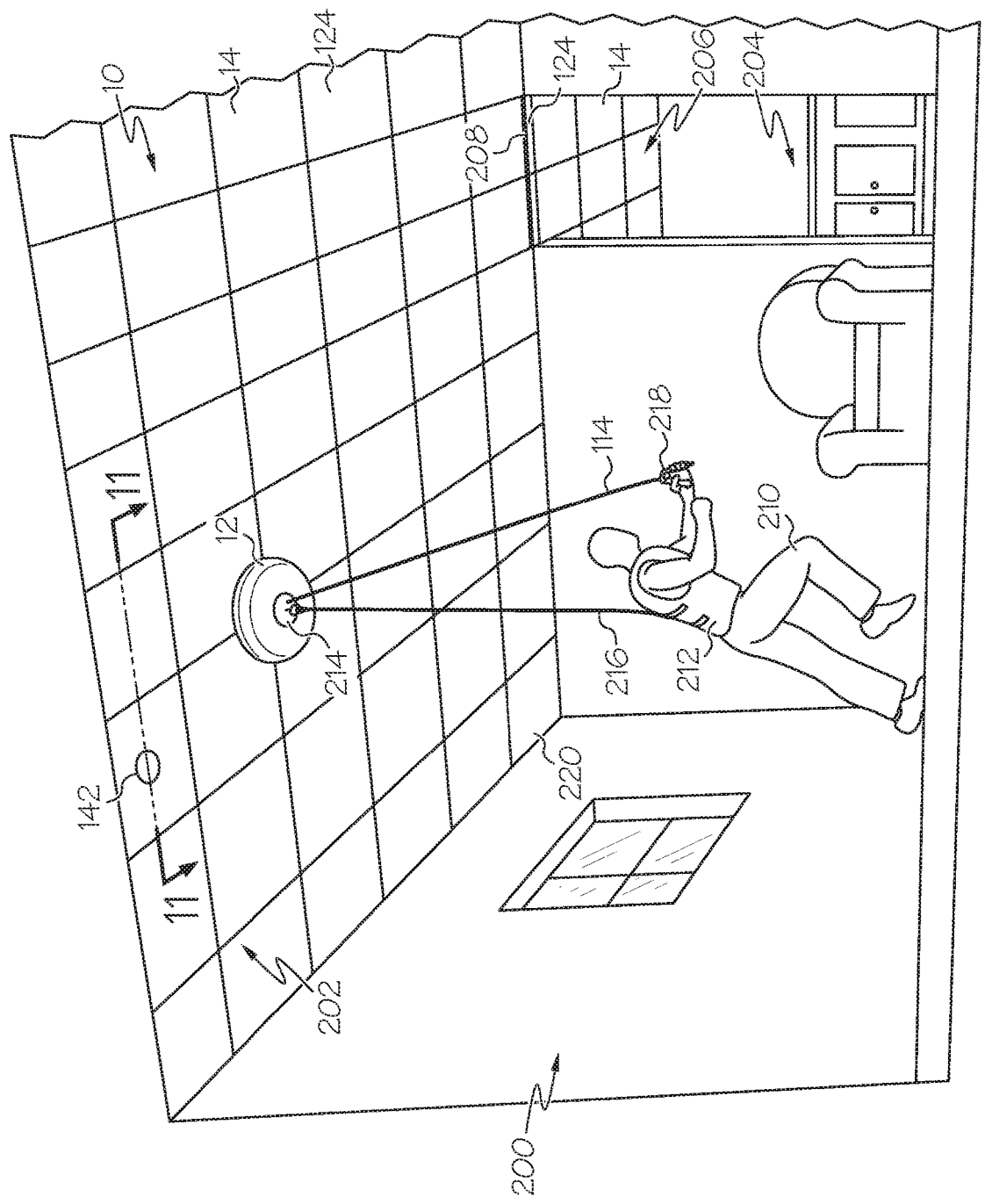
FIG. 12 is a perspective view of an embodiment of a magnetic conveyance system in accordance with the teachings of the present disclosure.

In one embodiment (not shown) support structure 14 may simply be a steel or iron plate secured to the underlying structural support members of the building. This embodiment can become weight and cost prohibitive upon the conveyance of large loads which require thick solid plates. Another embodiment of support structure 14 comprises a ceiling including a plurality of structural ceiling panels 124. As shown in FIG. 10, one embodiment of a ceiling panel 124 of support structure (ceiling) 14. Ceiling panel 124 may comprise an outer ferromagnetic layer 126, an upper outer layer 128 and a filler layer 130. In one embodiment, the outer ferromagnetic layer 126, the upper layer 128 and the filler layer 130 are all bound together by an adhesive or resin. Ceiling panel 124 is preferably a load bearing, structural panel configured to carry the design load capacity of the present conveyance system 10 between structural supports. As shown in FIGS. 1, 11, and 12, when utilizing a ceiling 14 as the support structure, the ceiling 14 may be comprised of plurality of ceiling panels 124. Ceiling panels 124 are preferably as light in weight as is practical. Material weight is relevant to costs and ease of installation. Ceiling panels 124 or sections thereof may be engineered toward the lightest and most easily commercialized form. Ceiling panels 124 may be painted or powder coated to provide an aesthetically pleasing appearance. Alternatively, in another embodiment, ceiling panel 124 may also include a thin harder outer wearing surface with or without ferromagnetic properties such as 300 series stainless steel, anodized aluminum, or even a hard polymer coating for appearance purposes. However, any smooth, flat surface could feasibly be employed as a surface for the trolley 12 to ride upon and attract through to the ferromagnetic layer 126.

Turning back to FIG. 10, outer bearing layer 126 may be one or more sheets of a ferromagnetic material as described above. Alternatively, outer bearing layer 126 may be a ferromagnetic coating applied to filler layer 130. The total thickness or gauge of outer bearing layer 126 may be selected to sufficiently absorb the entire magnetic field generated by trolley 12 and not much more, particularly because any redundancy in the thickness of the outer bearing layer only adds cost and weight to the ceiling tile 124 with no appreciable benefit. The flatness of the outer bearing layer 126 and its alignment with adjacent ceiling tiles 124 is also preferably substantially smooth and/or planar to allow for the trolley and its attractor cells to easily traverse the entire ceiling 14.

Upper layer 128 may be one or more sheets of any substantially rigid material. Upper layer 128 may be any sheet metal, such as steel, aluminum, or may be substantially rigid polymeric material. Upper layer 128 need not be ferromagnetic. An embodiment (not shown) may include upper layer 128 having raised ribs or a raised center portion to provide a more rigid panel. Filler layer 130 may be made from any material similarly used in building products. Some embodiments may include a rigid or substantially rigid foam or honeycomb. Some embodiments may include wood-based sheet materials like plywood, OSB, MDF or particle board. New lightweight composite board may also be utilized. Filler layer 130 may be one or more thin sheets of such material. The filler layer 130 will need to be sufficiently strong in tensile and shear capacity to support the pulling forces from below and to distribute them between the top layer 128 and bearing layer 126 to the top skin layer. In one embodiment, a single modular ceiling tile 124 may be sixteen (16) inches square and preferably weigh ten (10) pounds or less. However, ceiling panels 124 may have any length, width, and thickness feasible to facilitate manufacturing, installation, and/or desired load capacity.

Support structure or ceiling 14 is preferably a substantially smooth, flat and/or planar surface. One method of producing the flatness integrity preferred in the ferromagnetic surface of the panels has been built and tested successfully. This method consists of laminating several relatively thin layers of the ferromagnetic mild steel material together as bearing layer 126, in combination with a core material with another very thin stabilizing layer of sheet material as upper layer 128 with another sheet material being filler layer 130. The sheet material of upper layer 128 may be metal and the sheet material of filler layer 130 may be plywood, but other sheet materials are also within the scope of the invention. The composite ceiling panel layers can be assembled and bonded to one another simultaneously with an adhesive system such as epoxy, which would cure while the layers are held under pressure against a dead flat surface. This has been done using vacuum bagging techniques, but may more simply be performed under any compression loading such as a mechanical, hydraulic, air, or other type of compression applying mechanism, for example dead weight, a hydraulic press, or a compression roller. This process results in a very flat surface because it was possible to form the thin sheet layers tightly against the flat forming surface and allow for curing. A much thicker plate would require much heavier materials and expensive machining processes to obtain the same flatness. In addition, formation of ceiling panels 124 using the above process allows for one or more connection elements to be bonded and/or integrally formed into the ceiling panel 124 during formation if desired.

As shown in FIG. 11, ceiling panels 124 of ceiling 14 may be installed on a typical wood-frame ceiling framing layout. However, ceiling panels 124 may be mounted to substructure of any steel, concrete, wood, or other combination thereof using known techniques. As shown in FIG. 11, ceiling panels 124 may be coupled or fastened directly to ceiling joists 132 using a fastener such as a bolt, nail or screw. In addition, clips 136 may be used. Shims 134 may be required to create a smooth and/or flat bearing surface. In addition, clips 136 may include a vertical adjustment capability allowing the position of the panel to be adjustable. Ceiling panels 124 may include a tongue and groove engagement 138 or may have an overlapping interaction 140 as shown to facilitate the alignment of the panels for a smooth surface.

As further shown in FIG. 11, an embodiment of ceiling 14 may include light or other fixtures 142 disposed between joists 132 and under sheathing layer 144 as shown. The fixture 142 may include a light 146 contained with fixture 142 wherein a Plexiglas, polycarbonate or other clear material cover 148 is exposed with a ferromagnetic grid or diffuser 150 incorporated therein so that there are no "dead" spots on the ceiling. The Plexiglas, polycarbonate, or other clear material cover 148 would be installed so as to provide a smooth transition between the ceiling panel 124 and the fixture 142. In addition, if there are protrusions in the surface due to fixtures like ceiling fans, other light fixtures, etc., a curb or bumper 152 may be installed on ceiling panel 124 and/or ceiling 14 to prevent trolley 12 from running into the fixture. When installing the ceiling, a removal panel (not shown) may be installed or configured so as to be easily removed so that trolley 12 may be moved to this tile, and the tile can be easily removed with the trolley 12 attached to allow for removal and/or services of trolley 12. Alternatively, one or more removal panels may be non-ferromagnetic material wherein a removable curb or bumper prevents the trolley from moving onto this panel during operation, but when it is desirable for the trolley to be removed, the curb or bumper can be removed and the trolley may be slid onto the non-ferromagnetic panel wherein trolley 12 can easily be removed from support structure 14. Other embodiments of ceiling panel may be suspended from the support structure similar to conventional drop ceilings, but with an engineered system to carry the structural load of trolley 12 and supported elements.

Support structure 14 may be a ceiling, wall, floor, or any other surface or member. It is also within the scope of the present invention to provide an embodiment for temporary use and/or which may be portable. In this embodiment, a "temporary" substructure may be constructed with additional column supports spaced around a perimeter and/or the interior of the room with a beam system designed to carry the desired load supported by the columns. The ceiling structure or support structure 14 may be installed on the beam system. This embodiment may be desirable in residential application as it maintains the original finishes intact so that upon removal, no significant construction costs are required to uninstall the system and return the home to its original finishes.

In use, there are a number of applications for embodiments of the present conveyance system 10, with an example for residential or institutional uses in the conveyance of elderly, injured, and/or physically disabled persons who need mobility provision or assistance. For example, as shown in FIG. 12, an embodiment of the present conveyance system is shown in a room 200 of a home, hospital, or nursing home. Room 200 includes support structure 14 being a ceiling 202 comprising ceiling panels 124 installed above the entirety of the living environment. FIG. 12 also shows a second room or hallway 204 which also includes support structure 14 being ceiling 206 comprising ceiling panels 124 that are installed over the entire room. A smooth and/or seamless transition 208 between the ceiling 202 and ceiling 206 is shown.

As shown in FIG. 12, trolley 12 is disposed on ceiling 202. A user 210 may wear a harness 212 which is connected to a hoist 214 disposed on trolley 12 by a cable or strap 216. Hoist 214 may be operable by wired or wireless controls and may be capable of carrying all or a portion of the weight of the user 210. Hoist 214 may lift the user 210 off the ground. User 210 may use a mechanical brake release handle 218 disposed on an end of brake cable 114 to free trolley 12 from a fixed or braked position. Release handle 218 may include other controls to operate the hoist 214 or any other functions desirable, such as controls for motors to move trolley 12 on ceiling 14. If user 210 releases the brake by squeezing the brake handle 218, then trolley 12 may be laterally moved on the ceiling 202 anywhere in the room 200. This is a significant improvement over systems that require a track. In addition, due to the room 204 also having ceiling 206 with a smooth transition 208, the user 210 may walk with assistance provided by conveying system 10 from room 200 to room 204. There is no limit as to the movement of user 210 within the room or a single story building as long as support structure 14 is installed as a smooth ceiling throughout the structure. Similarly, a nurse or home health aide can use the hoist 214 to lift a patient and then the nurse or home health aide can utilize the controls to release the brake and assist or move the patient by themselves. Further FIG. 12 shows the removal panel 220 which in one embodiment may be easily removed or in another embodiment may be a non-ferromagnetic material protected by a curb or bumper. Removal panel 220 facilitates the easy removal of trolley 12 from its engagement with the support structure 14.

Moreover, the present magnetic conveyance system 10 also allows for more than one object to be supported simultaneously using multiple trolleys. Particularly advantageous is that multiple objects/users may be supported or suspended from the support surface and each object/user may simultaneously have full accessibility of movement over the entire support surface as long as the support surface has been designed to carry the loading pattern. To prevent an overload of the ceiling/floor above, the minimum spacing between users may be controlled by utilizing a spacing mechanism disposed on a trolley such as a fence to ensure a minimum spacing. For example, multiple patients in a hospital may be supported using the present magnetic conveying device 10 and each patient will have full access to any area in which the ceiling has been installed. Thus, any users may pass each other in a hall going the same or opposite directions, be in the same treatment room, or in the cafeteria and all the while having unfettered access to any portion of the rooms which have the ceiling. This flexibility is not realized by an existing conveyance system. Moreover, this flexibility and feature also lends to the use of the present magnetic conveyance system 10 in multiple settings, applications, and industries.

It will be appreciated that, in addition to human mobility applications, the magnetic conveyance system 10 of the present application has many other applications. In general, magnetic conveyance system 10 provides an alternative surface to which objects can be anchored to or suspended from. Magnetic conveyance system 10 provides multiple surfaces, in addition to a floor, which can be used to position and hold objects providing a significant improvement in the flexibility in the layout of objects in a room. For example, equipment in medical procedure rooms may be suspended from the ceiling wherein each piece of equipment is mounted on its own trolley. This application will free-up floor space in the medical procedure room. The magnetic conveyance system 10 may be used in industrial application to convey products from station to station during manufacturing, and move heavy objects around a manufacturing or packaging plant using only one operator or using a power unit controlled by manual operators or automated control systems, such as by robots.

Other uses of magnetic conveyance system 10 of the present invention may be the layout of commercial meeting spaces. Moveable wall panels may be supported by one or more trolleys and wherein the wall panels can be moved and selectively positioned in any location of a room having the ferromagnetic ceiling panels. Magnetic conveyance system 10 can also be used to hang shelving, art, lighting, equipment, signage, and/or interactive information in residential, commercial exhibit, or laboratory applications wherein the items may easily be repositioned anywhere in the room using one or more trolleys. Another foreseeable application of the present magnetic conveyance system is in theatrical and movie sets, video production and/or photography environments where the location of lighting, props, filters, cameras, and other objects are desired to be moveable and easily repositioned, but held securely in place at the desired location during use.

The present magnetic conveyance system 10 allows many objects not normally mounted on the ceiling to now be mounted above magnetically. Special trolleys to allow easy positioning and locking in place of inanimate objects is a simple offshoot of this technology. Moreover, the technology may be useful for securing and moving heavy objects easily on a floor in such applications as operating rooms wherein the operating table can be magnetically fixed to the floor using the brake, but can then be easily moved about the room for cleaning or reconfiguring using the friction reducing load spreading device.

As is evident from the foregoing description, certain aspects of the present invention are not limited to the particular details of the examples illustrated herein. It is therefore contemplated that other modifications and applications using other similar or related features or techniques will occur to those skilled in the art. It is accordingly intended that all such modifications, variations, and other uses and applications which do not depart from the spirit and scope of the present invention are deemed to be covered by the present invention.

Other aspects, objects, and advantages of the present invention can be obtained from a study of the drawings, the disclosures, and the appended claims.

I claim:

1. A magnetic conveyance system comprising:
   support structure defining a bearing surface and having a ferromagnetic capacity, wherein said support structure comprises one or more ceiling panels and said bearing surface is at least partially defined by said one or more ceiling panels;
   a trolley operably connected to said support structure and disposed for movement on said support structure in any direction substantially parallel to said bearing surface, said trolley comprising one or more magnet and one or more friction reducing load spreading device, wherein said friction reducing load spreading device is not one or more casters or one or more wheels disposed between the trolley frame and the support structure; and
   wherein said one or more magnet exerts a magnetic attraction force between said trolley and said support structure to operably come said trolley to said support structure.

2. The magnetic conveyance system of claim 1, wherein each ceiling panel comprises an outer ferromagnetic layer, an upper outer layer comprising a substantially rigid material, and a filler layer, wherein said outer ferromagnetic layer defines a substantially smooth flat surface.

3. The ceiling panel for a magnetic conveyance system of claim 1 wherein said ceiling panel is capable to be an element in a load bearing structure of a building and capable to support one or more suspended objects.

4. The magnetic conveyance system of claim 2, wherein outer ferromagnetic layer includes at least one layer of steel or iron, or ferromagnetic coating.

5. The magnetic conveyance system of claim 2, wherein said outer ferromagnetic layer is a sheet of steel or iron and wherein the upper outer layer and the filler layer each comprise one or more sheets of material and said sheets of said outer ferromagnetic layer said upper outer layer and said filler layer are bound together by a cured resin under pressure.

6. The magnetic conveyance system of claim 2, further comprising a wearing surface applied to said outer ferromagnetic layer opposite said outer layer.

7. The magnetic conveyance system of claim 2, wherein the outer ferromagnetic layer comprises of a plurality of layers of a ferromagnetic material laminated together.

8. The magnetic conveyance system of claim 7, wherein the ferromagnetic material is silicon steel.

* * * * *